July 17, 1956

M. KNOBEL 2,755,057

WEIGHING MACHINE

Filed Sept. 10, 1954

INVENTOR.
Max Knobel
BY J. Stanley Churchill
ATTORNEY

July 17, 1956 — M. KNOBEL — 2,755,057
WEIGHING MACHINE
Filed Sept. 10, 1954 — 2 Sheets-Sheet 2

INVENTOR.
Max Knobel
BY J. Stanley Churchill
ATTORNEY

2,755,057

WEIGHING MACHINE

Max Knobel, Boston, Mass., assignor to Pneumatic Scale Corporation, Limited, Quincy, Mass., a corporation of Massachusetts Application September 10, 1954, Serial No. 455,175

5 Claims. (Cl. 249—43)

This invention relates to a weighing machine.

In general one object of the invention is to provide novel weighing mechanism for embodiment in weighing machines of various types, wherein the movements of a movable weighing element operate to control the discharge of air from a novel pneumatic control device in a manner such as to afford a substantially greater range in the movement of the weighing element than has heretofore been possible in prior pneumatically controlled weighing mechanisms.

A further object of the invention is to provide a novel and improved weighing machine of the character embodying a pneumatically controlled weighing element in which provision is made for recording the variations in weight of successive loads being weighed by novel mechanism and over a substantially greater range of movement of the weighing element than has heretofore been possible in prior weighing machines of this type and without sacrificing the inherent accuracy of the weighing operation.

A still further object of the invention is to provide a novel weighing machine embodying a pneumatically controlled weighing element in which provision is made for operatively controlling the material feeding mechanism for forming successive loads to be weighed from movements of the weighing element through a substantially greater range of movement than has heretofore been possible in prior weighing machines of this type.

In the drawings illustrating the preferred embodiment of the invention:

In my United States Patent No. 2,634,080, dated April 7, 1953, for Weighing Machine, there is disclosed a weighing machine embodying a movable weighing element which is arranged to cooperate with an air gauge for pneumatically controlling the material feeding operation. The particular type of air gauge illustrated in said patent finds particular use in connection with the extremely accurate and rapid weighing operations wherein the beam or weighing element is moved an extremely small fraction of an inch of the order of .001". In some types of weighing operations, such as check weighing and in automatic weighing, depending upon the character of the material being weighed and upon the variations in the stream, it has been found to be advantageous to perform the weighing operation utilizing a greater range of movement of the weighing element than is possible with the pneumatic control mechanism of the type illustrated in the aforesaid patent.

Accordingly, the present invention contemplates a weighing mechanism which preferably embodies a pneumatic control instrumentality which cooperates with the movable weighing element to control the rate of discharge of the air therefrom and to thus effect variations in air pressure within the instrumentality over a substantial range of movement of the weighing element and in accordance with a pressure distance curve which is substantially linear over a relatively long range. For example, it is possible to so design the instrumentality that substantial pneumatic pressure changes may be effected by movement of the weighing element toward and from the discharge nozzle of the instrument over a range of from rest to .010" or more. This type of pneumatically controlled instrumentality also lends itself to simple variation of the slope of the pressure distance curve and of the relative proportion of sensitivity with relation to the extent of effective range as will be described.

The present invention may be embodied with advantage in a check weighing machine as well as in a weighing machine in which the material is fed onto the weighing element of the weighing machine in the form of bulk and drip streams, as will be described.

Figure 1:
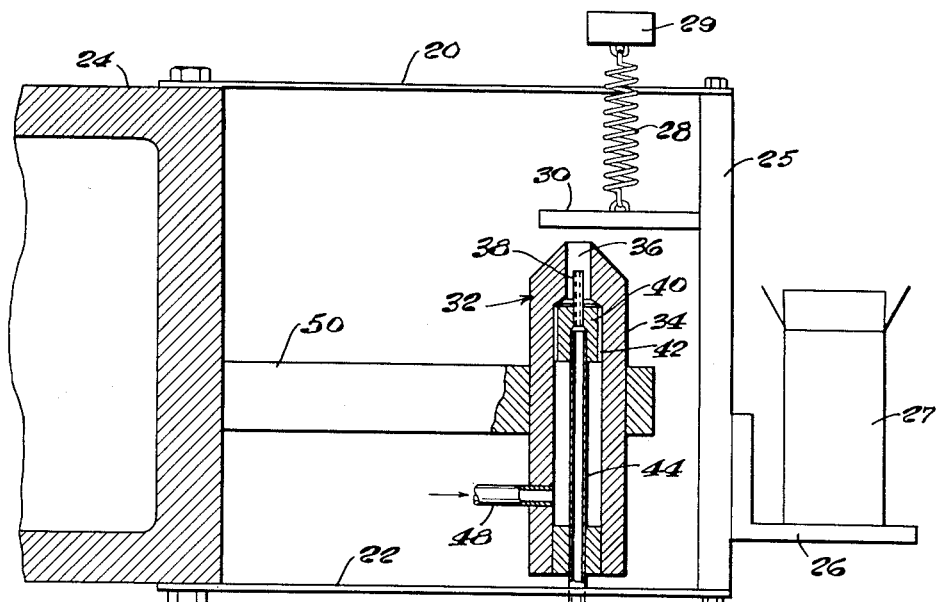
Fig. 1 is a side elevation partly in cross section of weighing mechanism embodying the present invention and which shows the mechanism connected to a pressure gauge for indicating the weight.

Referring to the drawings, the present invention for purposes of illustration has been shown as embodied in a weighing machine in which the weighing element comprises two pair of leaf springs 20, 22 secured at one end to a fixed part of a frame 24 and at their free ends connected by a rigid member 25 provided with a load supporting platform 26 upon which the load to be weighed is supported, herein shown as within a carton 27. The weight of the load may be partially supported by a coil spring 28 secured to a fixed part of the machine frame 29 and at its lower end to an arm 30 projecting from and integral with the member 25. The arm 30 is designed to cooperate with a novel pneumatic control member indicated generally at 32. As illustrated in Fig. 1, the instrumentality 32 includes a casing 34 having an exit orifice 36. A conduit passage formed by a metal tube 38 extends part way down the orifice 36 and is held in place by a plug 40 having a fluted periphery 42 to permit passage of air through the orifice 36. A tube 44 connects the tube 38 to an air pressure indicating instrument shown as a conventional pressure gauge 46. Air under pressure is admitted to the interior of the casing 34 through an inlet tube 48. This air entering the inlet tube 48 passes through the casing 34 and the flutes 42 into the orifice 36 from which it is discharged at the end thereof. During its passage through the orifice 36 the air passes by the end of the internal tube 38.

The pneumatic control instrumentality 32 may be operatively secured in an arm or bracket 50 supported from the fixed part of the machine frame 24, as illustrated, and in a position in which movement of the member 30, as the leaf springs 20, 22 are deflected downwardly under the influence of the weight of the loads being weighed, serves to control the rate of discharge of the air from the discharge orifice 36.

Figure 4:
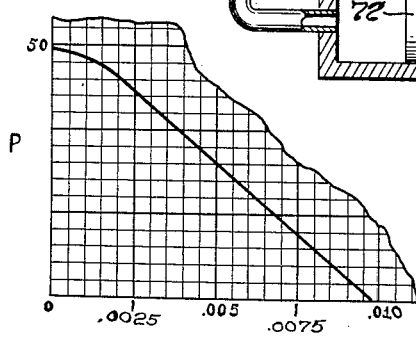
Fig. 4 is a chart indicating the performance of the present weighing mechanism.

This constitutes the essentials of a check weighing machine embodying the present invention, and in the operation of the machine as the member 30 approaches the discharge orifice 36 the discharge of air is restricted as the member approaches the nozzle with the result that the pressure changes within the conduit passage 44 vary rapidly and in accordance with a substantially straight line curve as the member 30 gradually restricts the flow of air from the nozzle until the nozzle is closed. In Fig. 4 I have plotted the curve produced from data obtained with an instrumentality of the general structure illustrated in Fig. 1 and in which the various essential elements are proportioned, as will be described. From a consideration of Fig. 4 it will be observed that substantial movements of the weighing element under the influence of variations in the loads being checked weighed may take place over a range from 0 to 0.010 inch with pressure changes within the conduit 44 of from 50 lbs. per sq. in. down to zero, and a relatively extended range of from about .001 to .0075 inch of movement with pressure changes of from about 45 lbs. per sq. in. to 10 lbs. per sq. in. provides a wide working range within which the curve is linear as shown in Fig. 4.

In check weighing, this extended range of movement of the weighing element in the linear pressure weight curve as shown in Fig. 4 enables the checked weights to be easily read on the gauge 46 and further enables the gauge to be calibrated in a satisfactory and accurate manner.

Figure 3:
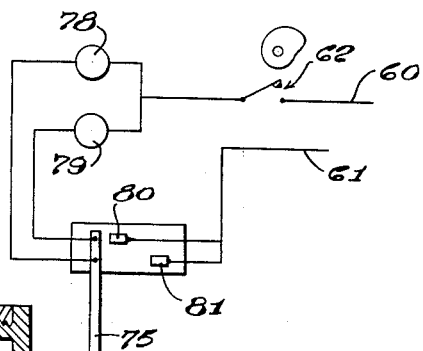
Fig. 3 is a detail view, partly in cross section, of a pneumatically operated motor adapted for connection to the mechanism shown in Fig. 1, and signal means actuated thereby for indicating variations in weights measured by the present weighing mechanism.

As illustrated in Fig. 3, I have diagrammatically illustrated a sufficient portion of the connections between my present pneumatic control device and a pair of lamps for visibly indicating the over and the underweight loads being check weighed. As therein illustrated, the current flows through the inlet and outlet lines 60, 61, its flow being controlled by a cam operated switch 62 of conventional design in the line 60. The cam may be timed to operate the switch when a load is moved onto the load receiving platform 26 of the weigher, and the weighing operation started. The line 44 (see Fig. 1) instead of being connected to the pressure gauge 46 is, as shown in Fig. 3, connected to a pneumatically operated motor comprising a casing 70 having a piston 72 moved in one direction by the pneumatic pressure and such movement is opposed by the coil spring 73 interposed between the second end of the casing 70 and the second side of the piston. The piston rod extends through the end of the casing and carries the moving contact arm 75. The incoming line 60 is wired to the contact arm through a parallel circuit in each branch of which one of the lamps 78, 79 is disposed. The second incoming line 61 is wired to each of the over and under fixed contacts 80, 81 so that during the check weighing operation the movable contact arm is moved into contact with and over the surface of the contact 80 when an underweight load is being weighed, and vice versa when an overweight load is being weighed the movable contact arm moves over and into contact with the fixed contact 81.

The extended range, indicated in Fig. 4, of permissible movement of the weighing element serves to enable the check weighing operation to be performed in a practical economic manner and minimizes the effects of extraneous forces, such as vibration on the accuracy of the check weighing operation. The cam of the cam operated switch 62 may be timed by suitable connections (not shown) to the operation of the check weighing machine, as will be obvious to one skilled in the art.

Figure 2:
Fig. 2 is a detail view showing a stylus and a recording sheet adapted for connection to the mechanism shown in Fig. 1.

If desired the conduit 44 may also be connected to the inlet line 90 of a pneumatically operated motor of the general type shown in Fig. 2 having a movable piston arranged to be moved in one direction by the pneumatic air pressure introduced into the casing through the inlet line 90 against a coil spring acting on the second side of the piston. The piston may carry a stylus 92 cooperating with a record sheet 94 so that variations in the weights of successive check weighed loads may be recorded.

Figure 5:
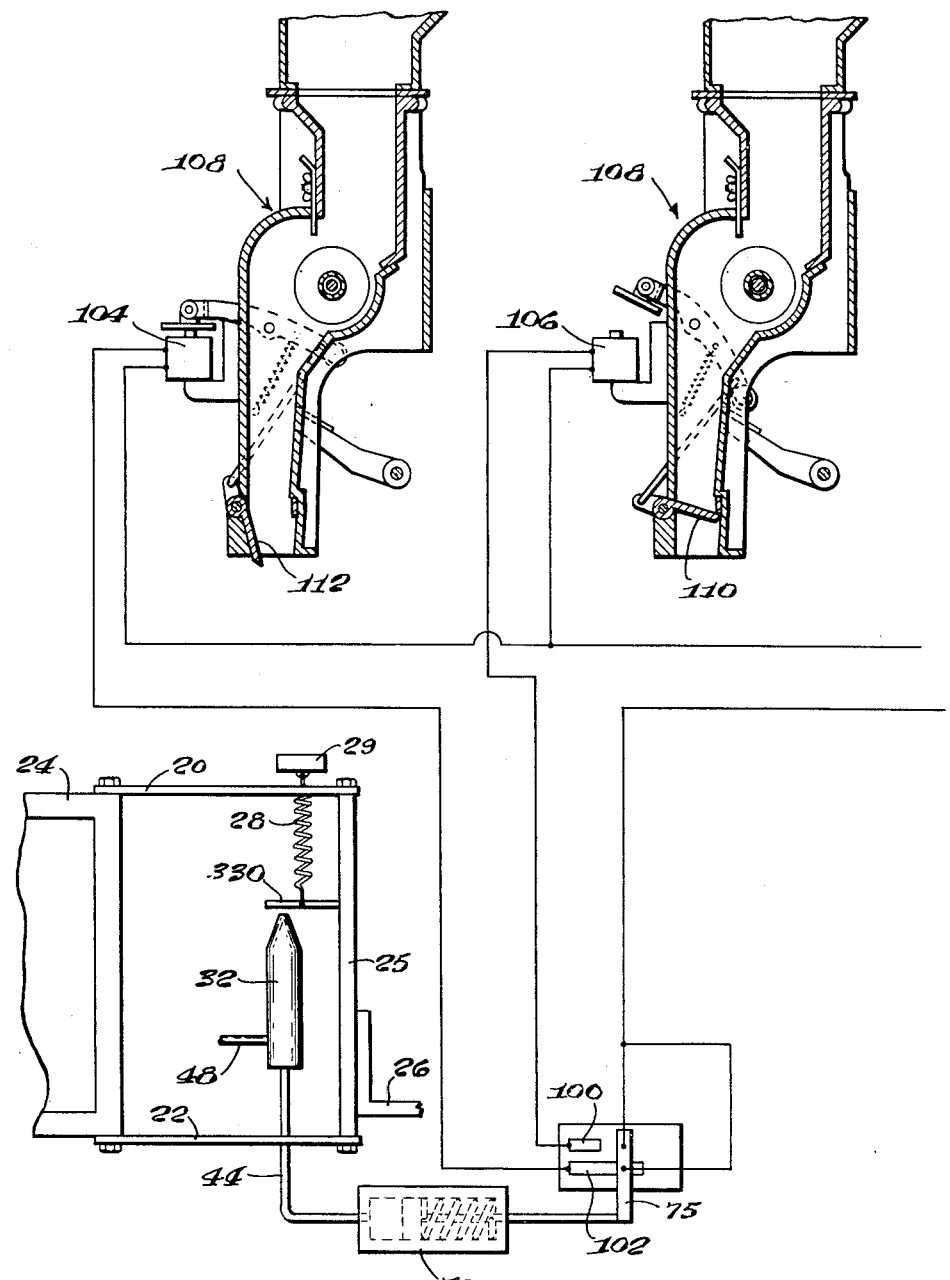
Fig. 5 is a view diagrammatically indicating the present weighing mechanism associated with the feed hopper of a weighing machine and control means for actuating the bulk and drip feed shutters of the feed hopper.

In Fig. 5 I have illustrated the present pneumatic control device operatively connected to material feeding mechanism for feeding the bulk and drip loads to the load receiving member of any usual or preferred form of weighing machine. For clarity of illustration the mechanical features of the weighing machine have been omitted and may comprise those illustrated in my Patent No. 2,634,080, above referred to. As illustrated in Fig. 5, the weighing element and associated parts may comprise those illustrated in Fig. 1 with a pneumatically operated motor of the type shown in Fig. 3 connected to the conduit 44 of the control device and with the contact arm arranged to cooperate with fixed contact members 100, 102 by which wiring circuits to the solenoids 104, 106 for operating the gate closing mechanism illustrated in the patent above referred to for terminating the flow of bulk and dribble streams as the arm 30 approaches the discharge nozzle of the pneumatic control device. For example, in weighing 5-lb. loads the bulk stream may be cut off when the pressure within the conduit 44 reaches 12 lbs. p. s. i., while the drip stream may be cut off when the pressure reaches 40 lbs. p. s. i. This corresponds on the curve shown in Fig. 4 to a movement of the arm 330 downwardly through a distance of from .0075" from the nozzle to a distance of about .0025". Assuming that a maximum stream flow during the movement of the arm 330 through the entire range shown in Fig. 4, that is, from 0 to .010 inch corresponds to 6 ounces of material, then the movement from .0075 to .0025 inch from the nozzle corresponds to an amount of material of at least 3 ounces which provides a factor of safety enabling the bulk stream to be surely cut off before too much material is introduced into the load. This is particularly so when the bulk stream is large and the density of the material varies widely.

The numeral 108 indicates a divided feed hopper in cross section of the type shown in Patent No. 2,634,080, one view showing a cross-section of the hopper which includes the bulk feed shutter 110, and the other view showing a cross section of the same hopper which includes the drip feed shutter 112. In operation the solenoids 104, 106 are normally energized to hold the shutters open, and when the pressure in the air motor 70 increases to an extent such as to move the contact 75 off the contact 100 the circuit to solenoid 106 is opened to release the bulk shutter 110 to close the same. Subsequently, when the pressure is further increased when a predetermined weight is reached, the contact 75 is moved off contact 102 to deenergize solenoid 104 to permit closing of the drip shutter 112.

The curve shown in Fig. 4 was obtained with a pneumatic control device of the construction illustrated in Fig. 1 having an orifice diameter of .031 inch with the end of the tube 38 set back from the end of the discharge orifice by a distance of an eighth of an inch, and wherein the tube 38 has an outside diameter of .018 inch. Variations in the diameter of the orifice impart different slopes to the curve, but all of the curves are characterized by their linear nature. In some instances it may be preferred to reverse the connections between the air inlet conduit 48 and the pressure conduit 44. In other words, it is possible to operate the control device with the air connection connected directly to the conduit 44 and the instrumentalities which, as illustrated, are shown connected to the conduit 44 are connected by the air inlet pipe 48.

In the design of the present pneumatic control device it is essential that the end of the tube 38 be spaced from the discharge orifice 36 a distance at least several times the greatest sectional dimension of the tube 38 and conduit 44 in order to get most linear characteristics and high sensitivity.

Having thus described the invention, what is claimed is:

1. In a weighing machine, pneumatic control means operating on the aspirator principle comprising a casing having an elongated orifice passage terminating in an orifice, a conduit forming a second passage within said orifice passage, said conduit terminating within the orifice passage and spaced a distance from said orifice, means for supplying air to one of the aforesaid passages, and means for connecting the other passage to pressure responsive means, a movable weighing element having means for supporting the load to be weighed, and discharge orifice control means cooperating with the discharge orifice to control the flow of air therefrom, said means being operatively connected with the weighing element to move therewith, said pneumatic control means being characterized by a performance curve reflecting variations in pressure which is substantially linear over the range from supply pressure to zero pressure.

2. In a weighing machine, pneumatic control means operating on the aspirator principle comprising a casing having an elongated orifice passage terminating in an orifice, a conduit forming a second passage within said orifice passage, said conduit terminating within the orifice passage and spaced a distance from said orifice, means for supplying air under pressure to one of the aforesaid passages, and means for connecting the other passage to pressure responsive means, a movable weighing element having means for supporting the load to be weighed, a discharge orifice control means cooperating with the discharge orifice to control the flow of the air therefrom, said means being operatively connected with the weighing element, pressure recording means and connections between the pressure recording means and said other passage, said pneumatic control means being characterized by a performance curve reflecting variations in pressure which is substantially linear over the range from supply pressure to zero pressure.

3. In a weighing machine, pneumatic control means operating on the aspirator principle comprising a casing having an elongated orifice passage terminating in an orifice, a conduit forming a second passage within said orifice passage, said conduit terminating within the orifice passage and spaced a distance from said orifice, means for supplying air under pressure to one of the aforesaid passages, and means for connecting the other passage to pressure responsive means, a movable weighing element having means for supporting the load to be weighed, a discharge orifice control means cooperating with the discharge orifice to control the flow of the air therefrom, said means being operatively connected with the weighing element, graphic recording means and connections between said recording means and said conduit for graphically recording variations in pressure in said other passage, said pneumatic control means being characterized by a performance curve reflecting variations in pressure which is substantially linear over the range from supply pressure to zero pressure.

4. In a weighing machine, pneumatic control means operating on the aspirator principle comprising a casing having an elongated orifice passage terminating in an orifice, a conduit forming a second passage within said orifice passage, said conduit terminating within the orifice passage and spaced a distance from said orifice, means for supplying air under pressure to one of the aforesaid passages, and means for connecting the other passage to pressure responsive means, a movable weighing element having means for supporting the load to be weighed, a discharge orifice control means cooperating with the discharge orifice to control the flow of the air therefrom, said means being operatively connected with the weighing element, means operatively connected with said conduit for indicating weights above and below a predetermined weight, said means including an electrical circuit, an air motor and a switch arm arranged to move with said air motor, said air motor being connected to said other passage, said pneumatic control means being characterized by a performance curve reflecting variations in pressure which is substantially linear over the range from supply pressure to zero pressure.

5. In a weighing machine, a weighing element having means for supporting the load to be weighed, means for feeding a bulk stream of the materials to be weighed onto the load receiving member of the weighing element, means for feeding a drip stream onto the load receiving member of the weighing element, pneumatic control means operating on the aspirator principle for controlling the operation of the bulk and drip stream feeding means, said control means comprising a conduit having an elongated orifice passage terminating in an orifice, a conduit forming a second passage within said orifice passage, said conduit terminating within the orifice passage and spaced a distance from said orifice passage, means for supplying air under pressure to one of the aforesaid passages, and means for connecting the other passage to pressure responsive means, means operatively connected with the bulk and drip feeding mechanism for terminating their feeding operations when the pneumatic pressure within said other passage reaches different amounts, said pneumatic control means being characterized by a performance curve reflecting variations in pressure which is substantially linear over the range from supply pressure to zero pressure.

References Cited in the file of this patent
UNITED STATES PATENTS

| 2,408,842 | Garretson et al. | Oct. 8, 1946 |
| 2,545,118 | St. Clair | Mar. 13, 1951 |
| 2,634,080 | Knobel | Apr. 7, 1953 |
| 2,634,082 | Knobel | Apr. 7, 1953 |